United States Patent Office 3,190,355
Patented June 22, 1965

3,190,355
WELL TREATING PROCESS
Cecil R. Clement, Bartlesville, Okla., assignor to Phillips Petroleum Company, a corporation of Delaware
No Drawing. Filed Feb. 18, 1963, Ser. No. 259,422
12 Claims. (Cl. 166—22)

This invention relates to a process for treating a well. A specific aspect of the invention pertains to the prevention of loss of drilling mud when drilling a well thru two or more strata comprising producible zones. A further aspect of the invention is concerned with prevention of loss of drilling mud and permanent plugging of a producing formation while reworking a lower producing formation in the same well.

The fine solids contained in a drilling fluid normally filter out on the face of the well bore to form a more or less fluid-imprevious filter cake that retards or prevents penetration of well fluid into the surrounding earth formations with waste of fluid. However, earth strata are sometimes encountered into which the drilling fluid passes in excessive amount without depositing an adequate filter cake—such as formations that are unsually porous or are transversed by cracks or fissures larger enough to admit the drilling fluid without adequate filtering action and formation of a sealing filter cake. Such formations are generally referred to as "thief" zones. The principle of adding particles of a material that will be strained out as the drilling fluid passes into the thief formation, thereby building up a deposit of filter cake through which the fluid cannot pass, is well known. On pages 562 and 563 of the book Composition and Properties of Oil Well Drilling Fuids by Rogers (Gulf Publishing Company, 1953) a list of 35 different sealing agents is given. These range from asbestos to wood shavings and include such materials as fish scales, coke, manure, and chicken feathers. In spite of the addition of one or more of these conventional materials, it is a common experience to lose excessive amount of drilling fluid when thief zones are encountered. Also, the filter cakes resulting from the use of the conventional materials are usually not entirely imprevious to the liquids in the drilling fluid, with the result that the adjacent formations are impregnated with unwanted fluid.

In multiple completion wells, oil and/or gas bearing strata are found at different levels and certain problems arise when drilling a well and after the well is completed with respect to the loss of drilling fluid to a pay zone. To illustrate, when drilling thru an upper pay zone or stratum to reach a lower pay zone, there is danger of sealing off and losing the upper zone by excessive deposits of drilling mud in the upper zone. It is therefore desirable to seal or plug the upper oil-bearing zone or stratum with as little drilling mud as possible while drilling to the lower oil-bearing zone for dual completion.

In another situation in which production has been effected thru dual completion in a well penetrating upper and lower pay zones, it is sometimes necessary to rework the lower zone which has a high bottom hole pressure requiring the filling of the well with drilling mud while operating in the lower zone to rework same. There is danger of permanently losing the upper zone as a producing zone by forcing excess amounts of drilling mud into this zone to such a depth that it is impractical to remove the drilling mud to open up this zone to production again.

This invention is concerned with operational techniques which solve the foregoing problems.

Accordingly, it is an object of the invention to provide a novel method or process for drilling a well penetrating upper and lower pay zones. Another object is to provide a process for sealing a pay zone with minimum deposition of drilling mud in this zone. A further object is to provide a method of operating a well process in a dual completion well which permits reworking of a lower pay zone without permanently sealing off an upper pay zone. It is also an object of the invention to provide a process for temporarily sealing a pay zone which permits readily unsealing same. Other objects of the invention will become apparent to one skilled in the art upon consideration of the accompanying disclosure.

A broad aspect of the invention comprises temporarily sealing a pay zone in a well with particulate metal or alloy in the form of foil, filings, or wool in combination with a drilling mud whereby the particulate metal bridges the openings in the stratum containing the hydrocarbon material and the mud forms a barrier over the particulate metal, thus preventing loss of drilling fluid to the stratum, and thereafter, when the occasion demands, rendering the metal fluid by dissolving the same in a solvent for the metal or applying heat so as to melt the metal. This technique is applied to an upper pay zone or stratum while drilling to a lower pay zone or stratum in the same well preparatory to dual completion of the well. The sealing is effected as the drilling process continues thru the upper pay zone and, after penetrating the lower pay zone, the well is packed off intermediate the two pay zones and the bridging metal in the upper pay zone is removed by solvent action or heat so as to open up this pay zone to production. The packer and plug closing the well between the two zones is then removed and dual completion is then effected. If desired, the seal in the upper pay zone may be left in place either permanently or for any desired length of time.

In reworking a lower producing zone of a dual completion well without unduly disturbing the upper producing zone, the packer normally placed below the upper producing zone is plugged and the upper zone is sealed with particulate metal and mud. Any reworking of the lower zone required, such as replacement of well equipment at the lower level, additional perforations, etc., is then effected and the upper zone is then unsealed to allow production therefrom. Where the pressure at the lower zone is high, such as to require the use of drilling mud to hold the pressure while reworking the same, it is at least highly dangerous not to temporarily seal the upper pay zone during this reworking if pressure requires the use of drilling mud in this operation. By closing off the hole just below the upper pay zone and circulating drilling mud containing particulate metal thru the upper section of the hole and along the upper zone, this pay zone is temporarily sealed for the work to follow, thereby avoiding danger of permanently losing this producing zone.

To illustrate the need for the foregoing process, reference is made to the Puckett Field in Pecos County, Texas, where the Ellenberger sand lies at about 14,000 feet deep and certain wells in that field are producing from a much higher zone as well as from the Elbenberger sand. Because of the corrosion problem in the Ellenberger sand, it was found necessary to rework or replace equipment therein and the pressure is such that it was necessary to hold the pressure during reworking by filling the hole with drilling mud. This practice resulted in almost losing the upper pay zone as a producing zone because of the loss of drilling mud thereto and the depth of penetration of the mud during the reworking. Another need for temporarily sealing the upper zone arose when it was found necessary to effect additional perforation in the lower zone. Actually, the Ellenberger zone extends about 1,000 feet or more in depth, some of which is gas-producing and which was not perforated originally because of the lack of need of this gas. When perforation was effected at a later date the desirability of temporarily sealing off the upper pay zone was apparent.

Non-limiting examples of metals that can be used in the invention in the form of foil, filings, or wool, together with reagents that will dissolve the metal are listed below.

Metal:                            Soluble in—
    Aluminum          HCl, $H_2SO_4$, alkali.
    Chromium          HCl, dilute $H_2SO_4$.
    Copper             $HNO_3$, hot $H_2SO_4$, ammonia.
    Iron                 Acids.
    Lead                 $HNO_3$.
    Magnesium        Acids, ammonium salts.
    18–8 Cr-Ni stainless steel    HCl.
    Manganese         Dilute acids.
    Nickel             Dilute $HNO_3$; slightly in HCl, $H_2SO_4$.
    Tin                  Acids, hot alkalies.
    Zinc                 Acids, alkalies.

Materials such as chromium, manganese, nickel, and tin normally would not be used because of expense, but in special situations their use might be justified. It is within the scope of the invention to use alloys in foil, filings, or wool form, to use foils, filings, or wool that are salt-soluble, or to use foils, filings, or wool with selected melting point that can later be removed from the formation by circulating hot fluid or by direct application of heat from a downhole heater. Some alloys melt at temperatures well below 800° F., a temperature which can be readily obtained by direct application of heat or by hot combustion gas circulated in contact with the bridging metal. Single metals such as tin, lead and zinc also have relatively low melting points.

*Example*

Tests were made in a laboratory lost-circulation slot tester to compare the effectiveness of aluminum foil and aluminum filings for sealing slots of different sizes. This tester is described and pictured on page 135 ff. of Rogers, supra. For comparison a commercial lost-circulation material, Tuf-Plug (ground walnut shells) was tested. Various concentrations of these materials were added to a laboratory mud (7 percent attapulgite in tap water) for testing.

| Material | Concn., lb./bbl. | Slot Size, inches | Fluid Loss at Hydrostatic Head, ml. | Fluid Loss at 1,000 p.s.i., ml. in 5 minutes |
|---|---|---|---|---|
| Aluminum filings, fine | 10 | 0.05 | 15 | 25 |
| Same | 5 | 0.05 | 20 | 25 |
| Same | 5 | 0.10 | No Seal | |
| Same | 10 | 0.10 | No Seal | |
| Tuf-Plug, medium | 5 | 0.05 | 20 | 15 |
| Same | 5 | 0.10 | No Seal | |
| Tuf-Plug, fine | 5 | 0.05 | No Seal | |
| Chopped aluminum machinings, fine | 5 | 0.10 | 300 | 175 |
| Same | 5 | 0.15 | No Seal | |
| Chopped aluminum machinings, fine | 10 | 0.15 | 200 | 45 |
| And coarse, 50/50 | 10 | 0.20 | 500 | 60 |

These data show that metal filings or machinings are equivalent to or better than a commercial lost-circulation material. For example, sealing of a 0.05-inch slot was obtained with 5 lb./bbl. of fine aluminum filings but could not be obtained with fine Tuf-Plug. Sealing of a 0.10-inch slot was obtained with 5 lb./bbl. of fine aluminum machining, but could not be obtained with medium Tuf-Plug. Sealing of 0.15- and 0.20-inch slots was obtained with a mixture of fine and coarse machinings, and was obviously impossible with either fine or medium Tuf-Plug—based on their performance with smaller slots.

The size of metal foil, filings, or wool used obviously depends on the size of the openings in the lost-circulation area. The size can be varied dependent on the size of those openings, and mixtures of different size materials can be used. The concentration of the metal to be used generally lies in the range of 0.5 to 15 lb./bbl. of drilling mud, but higher concentrations may be used.

Certain modifications of the invention will become apparent to those skilled in the art and the illustrative details disclosed are not to be construed as imposing unnecessary limitations on the invention.

I claim:
1. In an oil well wherein upper and lower strata have been produced and the lower stratum is to be reworked involving holding of pressure on said lower stratum with drilling mud, the process comprising the steps of:
   (1) packing off said well intermediate said strata;
   (2) thereafter, plugging said upper stratum by circulating drilling mud containing particulate metal in said well along said upper stratum to deposit metal and mud on the wall of the stratum;
   (3) thereafter, removing the packing of step (1) and reworking said lower stratum, including maintaining substantial pressure on said lower stratum with drilling mud in said well;
   (4) thereafter, again packing off said well intermediate said strata;
   (5) thereafter, rendering the bridging metal fluid so as to unplug said upper stratum; and
   (6) opening said well to production from both strata.

2. In an oil well wherein upper and lower strata have been produced and the lower stratum is to be reworked involving holding of pressure on said lower stratum with drilling mud, the process comprising the steps of:
   (1) packing off said well intermediate said strata;
   (2) thereafter, plugging said upper stratum by circulating drilling mud containing particulate metal in said well along said upper stratum to deposit metal and and mud on the wall of the stratum;
   (3) thereafter, removing the packing of step (1) and reworking said lower stratum, including maintaining substantial pressure on said lower stratum with drilling mud in said well;
   (4) thereafter, again packing off said well intermediate said strata;
   (5) thereafter, unplugging said upper stratum by contacting the deposited metal with a solvent therefor so as to dissolve same; and
   (6) opening said well to production from both strata.

3. The process of claim 2 wherein said metal is aluminum.

4. The process of claim 2 wherein said metal is soluble in an aqueous alkali solution and said solution is utilized in step (5).

5. The process of claim 2 wherein said metal is soluble in aqueous acid solution and said solution is utilized in step (5).

6. In a well drilling process in an earth formation comprising circulating an aqueous drilling mud from the well head thru a drill string and a bit on its lower end and along the wall of the hole wherein the hole penetrates a stratum of such permeability that there is substantial loss of said mud into the stratum, the improvement comprising the steps of:
   (1) incorporating in said mud, metal in particulate form in a concentration in the range of 0.5 to 15 lb./bbl. of mud and circulating resulting mud along the wall of said hole adjacent said stratum so as to seal same with bridging metal particles and mud;
   (2) continuing the drilling operation to reach a lower stratum; and
   (3) thereafter, rendering the bridging metal fluid by heating and melting same so as to unseal first said stratum.

7. The process of claim 6 wherein said metal is aluminum.

8. The process of claim 6 wherein a mixture of coarse and fine metal particles each in substantial proportions is utilized as said metal.

9. The process of claim 6 wherein a metal melting below about 800° F. is used as said metal.

10. The process of claim 9 wherein said metal is an alloy.

11. A process for drilling a well penetrating an upper producible stratum and a lower producible stratum which comprises the steps of:
  (1) drilling thru said upper stratum with a bit on a hollow drill string while circulating drilling mud thru said string and bit and along the wall of the hole;
  (2) incorporating in said mud while drilling thru said upper stratum, metal in particulate form so as to cause said metal to bridge the voids in said upper stratum and said mud to form a seal over the metal and stratum;
  (3) continuing the drilling operation so as to reach and penetrate said lower stratum;
  (4) packing off the hole intermediate the two strata; and
  (5) heating the upper stratum so as to melt said metal and unseal and open up said upper stratum.

12. The process of claim 11 wherein said metal is aluminum.

References Cited by the Examiner
UNITED STATES PATENTS

| | | | |
|---|---|---|---|
| 2,124,495 | 7/38 | Miller | 166—22 |
| 2,245,886 | 6/41 | Weir et al. | 175—65 X |

FOREIGN PATENTS 794,104  2/36  France.

CHARLES E. O'CONNELL, *Primary Examiner.*